(12) United States Patent
Mofidi et al.

(10) Patent No.: US 9,781,675 B2
(45) Date of Patent: Oct. 3, 2017

(54) DETECTING NARROW BAND SIGNALS IN WIDE-BAND INTERFERENCE

(71) Applicant: QUALCOMM Incorporated, San Diego, CA (US)

(72) Inventors: Mahbod Mofidi, San Diego, CA (US); RaviKiran Gopalan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 14/957,964

(22) Filed: Dec. 3, 2015

(65) Prior Publication Data

US 2017/0164289 A1 Jun. 8, 2017

(51) Int. Cl.
*H04W 52/02* (2009.01)
*H04W 4/00* (2009.01)
*H04B 1/10* (2006.01)

(52) U.S. Cl.
CPC ...... *H04W 52/0245* (2013.01); *H04B 1/1027* (2013.01); *H04W 4/008* (2013.01); *H04W 52/0229* (2013.01)

(58) Field of Classification Search
CPC ......... H04W 52/0245; H04W 52/0229; H04W 52/246; H04W 52/247; H04W 52/283; H04W 52/242; H04W 4/008; H04B 1/1027

See application file for complete search history.

(56) References Cited

U.S. PATENT DOCUMENTS

| 5,119,432 | A | 6/1992 | Hirsch | |
|---|---|---|---|---|
| 7,042,221 | B2 | 5/2006 | Carney et al. | |
| 8,233,566 | B2 | 7/2012 | Birru | |
| 8,233,862 | B2 | 7/2012 | Gaddam et al. | |
| 8,787,230 | B2 * | 7/2014 | Ly-Gagnon | H04W 52/0229 370/311 |
| 8,787,840 | B2 * | 7/2014 | Srinivasan | H04W 52/0245 370/216 |

(Continued)

FOREIGN PATENT DOCUMENTS

| EP | 1819060 A1 | 8/2007 |
|---|---|---|
| WO | WO-2009038450 A2 | 3/2009 |

OTHER PUBLICATIONS

International Search Report and Written Opinion—PCT/US2016/054477—ISA/EPO—dated Dec. 23, 2016.

*Primary Examiner* — Habte Mered
(74) *Attorney, Agent, or Firm* — Paradice and Li LLP/Qualcomm

(57) ABSTRACT

Systems and methods are disclosed that may detect a likely presence of a narrow band signal in the presence of wide-band interference without powering up a wireless receiver. A wireless device may receive a wireless signal, measure a first energy level in a first frequency band associated with an expected frequency band of the narrow band wireless signal, measure a second energy level in a second frequency band that is offset from and non-overlapping with the first frequency band, and determine whether a difference between the first energy level and the second energy level exceeds a threshold. A wireless receiver of the wireless device may be powered up based at least in part on the difference between the first energy level and the second energy level exceeding the threshold.

30 Claims, 9 Drawing Sheets

(56) References Cited

U.S. PATENT DOCUMENTS

| | | | |
|---|---|---|---|
| 2007/0110193 A1* | 5/2007 | Solum | H03G 3/3052 375/345 |
| 2008/0181155 A1* | 7/2008 | Sherman | H04W 52/0229 370/311 |
| 2010/0246420 A1 | 9/2010 | Tu et al. | |
| 2012/0171978 A1* | 7/2012 | Sharma | H04B 1/1638 455/230 |
| 2013/0195215 A1* | 8/2013 | Manglani | H04B 17/318 375/295 |
| 2014/0080414 A1* | 3/2014 | Gopalan | H04B 5/0075 455/41.1 |
| 2015/0131464 A1* | 5/2015 | Ukita | H04W 88/10 370/252 |
| 2015/0188587 A1* | 7/2015 | Imamura | H04W 52/0229 455/226.2 |
| 2015/0245293 A1* | 8/2015 | Imamura | H04W 52/0229 370/311 |
| 2015/0295604 A1* | 10/2015 | Cheah | H04B 1/1027 375/316 |

* cited by examiner

DETECTING NARROW BAND SIGNALS IN WIDE-BAND INTERFERENCE

TECHNICAL FIELD

The example embodiments relate generally to wireless networks, and specifically to providing low-power detection of the presence of wireless signals.

BACKGROUND OF RELATED ART

Many wireless devices such as smartphones and tablet computers are capable of wireless communication with other devices using wireless communication signals of different technologies or protocols including, for example, wireless local area network (WLAN) signals, BLUETOOTH® (BT or Bluetooth) signals, near field communication (NFC) signals, and cellular signals such as long term evolution (LTE) signals. Many WLAN and Bluetooth signals operate in the same portion of the ISM band (e.g., between approximately 2.4 GHz and 2.48 GHz), and some LTE signals operate in the range of 2.5 GHz. As a result, the transmission of WLAN, Bluetooth, and/or LTE signals from one wireless device may interfere with the reception of wireless by another wireless device. Further, many household appliances (e.g., cordless phones and microwave ovens) operating in the ISM band may cause additional interference in the reception of wireless communication signals.

Interference resulting from many devices operating in the same (or similar) portions of the ISM band may present challenges for a wireless device when detecting communication signals having a relatively narrow bandwidth in the presence of other signals, noise, and/or interference having a relatively wide bandwidth. For example, while Bluetooth signals are typically transmitted on channels having a bandwidth between approximately 1 MHz and 2 MHz, Wi-Fi signals may be transmitted on channels having bandwidths ranging from approximately 20 MHz to approximately 160 MHz. More specifically, interference resulting from many devices transmitting signals (or radiating energy) in the same portion of the ISM band may result in false signal detection for receivers employing simple energy detection techniques. Although receivers may be designed to detect, acquire, and demodulate narrow band signals in the presence of wide-band interference, such receivers may consume significant amounts of power and yet still be susceptible to instances of false signal detection. It would therefore be desirable to reduce the instances of false signal detection in wireless devices and/or to reduce the power consumption associated with detecting narrow band signals in the presence of wide-band interference.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Apparatus and methods are disclosed that may allow for detection of a narrow band wireless signal in the presence of wide-band interference without using a receiver in a full-power state. In one example, a method of detecting a narrow band wireless signal in a presence of wide-band interference is disclosed. The method may include receiving a wireless signal; measuring a first energy level of the wireless signal in a first frequency band associated with the narrow band wireless signal; measuring a second energy level of the wireless signal in a second frequency band that is non-overlapping with the first frequency band; determining whether a difference between the first energy level and the second energy level exceeds a threshold; and transitioning a receiver of the wireless device to a full-power state based, at least in part, on the difference between the first energy level and the second energy level exceeding the threshold.

In another example, an apparatus for detecting a narrow band wireless signal in a presence of wide-band interference is disclosed. The apparatus may include means for receiving a wireless signal; means for measuring a first energy level of the wireless signal in a first frequency band associated with the narrow band wireless signal; means for measuring a second energy level of the wireless signal in a second frequency band that is non-overlapping with the first frequency band; means for determining whether a difference between the first energy level and the second energy level exceeds a threshold; and means for transitioning a receiver of the wireless device to a full-power state based, at least in part, on the difference between the first energy level and the second energy level exceeding the threshold.

In another example, an apparatus for detecting a narrow band wireless signal in a presence of wide-band interference is disclosed. The apparatus may include one or more processors and a memory configured to store instructions. Execution of the instructions by the one or more processors may cause the apparatus to perform operations including receiving a wireless signal; measuring a first energy level of the wireless signal in a first frequency band associated with the narrow band wireless signal; measuring a second energy level of the wireless signal in a second frequency band that is non-overlapping with the first frequency band; determining whether a difference between the first energy level and the second energy level exceeds a threshold; and transitioning a receiver of the wireless device to a full-power state based, at least in part, on the difference between the first energy level and the second energy level exceeding the threshold.

BRIEF DESCRIPTION OF THE DRAWINGS

The example embodiments are illustrated by way of example and are not intended to be limited by the figures of the accompanying drawings, where.

Like reference numerals refer to corresponding parts throughout the drawing figures.

DETAILED DESCRIPTION

Figure 1:
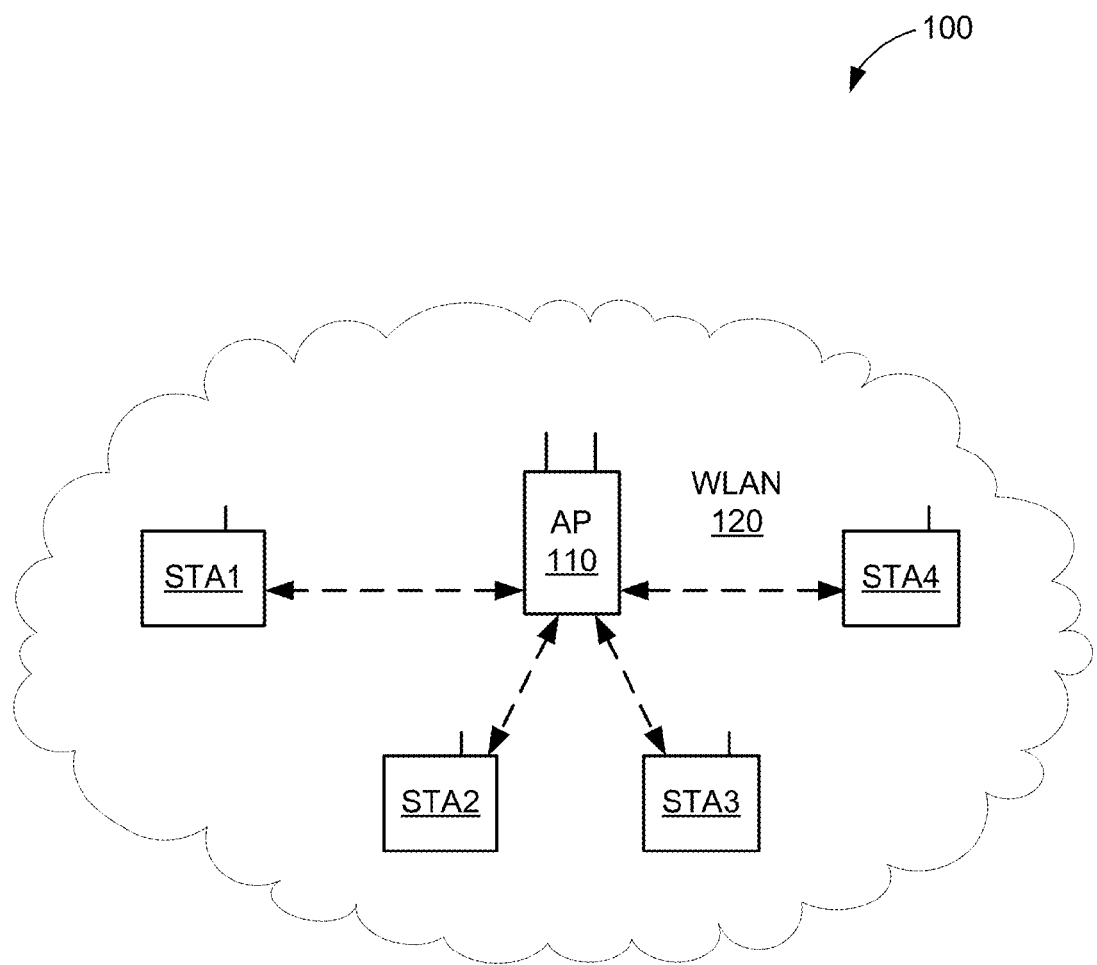
FIG. 1 shows a block diagram of a wireless system within which the example embodiments may be implemented.

The example embodiments are described below in the context of mobile stations (STAs) for simplicity only. It is to be understood that the example embodiments are equally applicable to other types of wireless devices (e.g., laptops, tablets, audio headsets, audio speakers, and so on). Further, the example embodiments described herein may be employed in any suitable wireless network or system (e.g., Wi-Fi networks, Personal Area Networks (PANs), cellular networks, pico networks, femto networks, satellite networks), as well as for systems using signals of one or more wired standards or protocols (e.g., Ethernet and/or Home-Plug/PLC standards). As used herein, the terms "WLAN" and "Wi-Fi®" may include communications governed by the IEEE 802.11 family of standards, IEEE 802.15.4, Bluetooth (including basic rate, extended data rate, and Bluetooth low energy), HiperLAN (a set of wireless standards, comparable to the IEEE 802.11 standards, used primarily in Europe), ZigBee, near-field communications (NFC), and other technologies having relatively short radio propagation range. Thus, the terms "WLAN" and "Wi-Fi" may be used interchangeably herein. In addition, although described below in terms of an infrastructure WLAN system including one or more APs and a number of STAs, the example embodiments are equally applicable to other WLAN systems including, for example, multiple WLANs, peer-to-peer (or Independent Basic Service Set) systems, Wi-Fi Direct systems, and/or Hotspots.

In addition, although described herein in terms of exchanging data frames between wireless devices, the example embodiments may be applied to the exchange of any data unit, packet, and/or frame between wireless devices. Thus, the term "frame" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs. Further, as used herein, the term "narrow band signal" may refer to a wireless signal transmitted on a channel having a relatively narrow bandwidth, and the term "wide-band signal" may refer to a wireless signal transmitted on a channel having a relatively wide bandwidth. In some aspects, a Bluetooth signal may be referred to as a "narrow band signal" because Bluetooth signals are typically associated with a channel bandwidth of between 1-2 MHz, and a Wi-Fi signal may be referred to as a "wide-band signal" because Wi-Fi signals are typically associated with a channel bandwidth of at least 20 MHz. Further, the term "wide-band interference" may refer to noise, interference, and/or undesirable communication signals that occupy a relatively wide bandwidth. In some aspects, a "relatively wide bandwidth" may refer to a bandwidth that is one or more orders of magnitude greater than a "relatively narrow bandwidth."

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Further, many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. The example embodiments are not to be construed as limited to specific examples described herein but rather to include within their scopes all embodiments defined by the appended claims.

As mentioned above, wireless receivers may need to detect narrow band signals in the presence of wide-band signals, noise, and/or interference (hereinafter collectively referred to as "wide-band interference"). Wide-band interference is becoming increasingly problematic in widely used frequency bands such as the ISM frequency bands, for example, as more and more devices communicate over these frequency bands. Specifically, wide-band interference may cause false signal detection for wireless receivers employing simple energy detection techniques. False signal detection may result in unnecessary power consumption, for example, when the wireless receiver attempts to detect a narrow band signal that is not present. In addition, the wireless receiver may also unnecessarily consume power when attempting to detect a narrow band signal in the presence of too much noise or interference (e.g., when a level of interference exceeds a threshold). It is therefore desirable to reduce the power consumption of wireless receivers (i) when attempting to detect a narrow band signal that is not present, and (ii) when attempting to detect a narrow band signal in the presence of too much noise or interference.

Accordingly, the example embodiments described herein may allow for low-power detection of a narrow band wireless signal in the presence of wide-band interference. For at least some embodiments, a wireless receiver of a wireless device may remain in a low power state until the presence of a narrow band wireless signal is detected, and may thereafter be transitioned to an active or full-power state. In this manner, wireless devices of the example embodiments may reduce power consumption associated with attempts to detect narrow band wireless signals that are not present and/or associated with attempts to detect narrow band wireless signals that are present but difficult to detect because of interference.

The example embodiments may allow for a low-power detection of a narrow band wireless signal by measuring a first energy level of a first frequency band associated with an expected frequency band of the narrow band wireless signal and by measuring a second energy level of a second frequency band that is offset from and non-overlapping with the first frequency band. A difference between the first energy level and the second energy level may be compared with a threshold. In some aspects, a determination that the difference exceeds the threshold may indicate that the narrow band wireless signal is present, and may cause a wireless receiver to transition to a full-power state, for example, to demodulate the received narrow band wireless signal. These and other details of the example embodiments, which provide one or more technical solutions to the aforementioned technical problems, are described in more detail below.

FIG. 1 is a block diagram of a wireless system 100 within which the example embodiments may be implemented. The wireless system 100 is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that WLAN 120 may be formed by any number of access points such as AP 110. The AP 110 may be assigned a unique media access control (MAC) address that is programmed therein by, for example, the manufacturer of the access point. Similarly, each of the stations STA1-STA4 may also be assigned a unique MAC address. For some embodiments, the wireless system 100 may correspond to a multiple-input multiple-output (MIMO) wireless network. Further, although the WLAN 120 is depicted in FIG. 1 as an infrastructure BSS, for other example embodiments, WLAN 120 may be an IBSS, an ad-hoc network, or a peer-to-peer (P2P) network (e.g., operating according to the Wi-Fi Direct protocols).

Each of stations STA1-STA4 may be any suitable Wi-Fi enabled wireless device including, for example, a cell phone, personal digital assistant (PDA), tablet device, laptop computer, or the like. Each station STA may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, each station STA may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 9.

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. For at least one embodiment, AP 110 may include one or more transceivers, one or more processing resources (e.g., processors and/or ASICs), one or more memory resources, and a power source. The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 9.

For the stations STA1-STA4 and/or AP 110, the one or more transceivers may include Wi-Fi transceivers, Bluetooth transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within a 2.4 GHz frequency band and/or within a 5 GHz frequency band in accordance with the IEEE 802.11 specification. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers included within the STA may be any technically feasible transceiver such as a Bluetooth transceiver, a ZigBee transceiver described by a specification from the ZigBee specification, a WiGig transceiver, and/or a HomePlug transceiver described a specification from the HomePlug Alliance.

Figure 2:
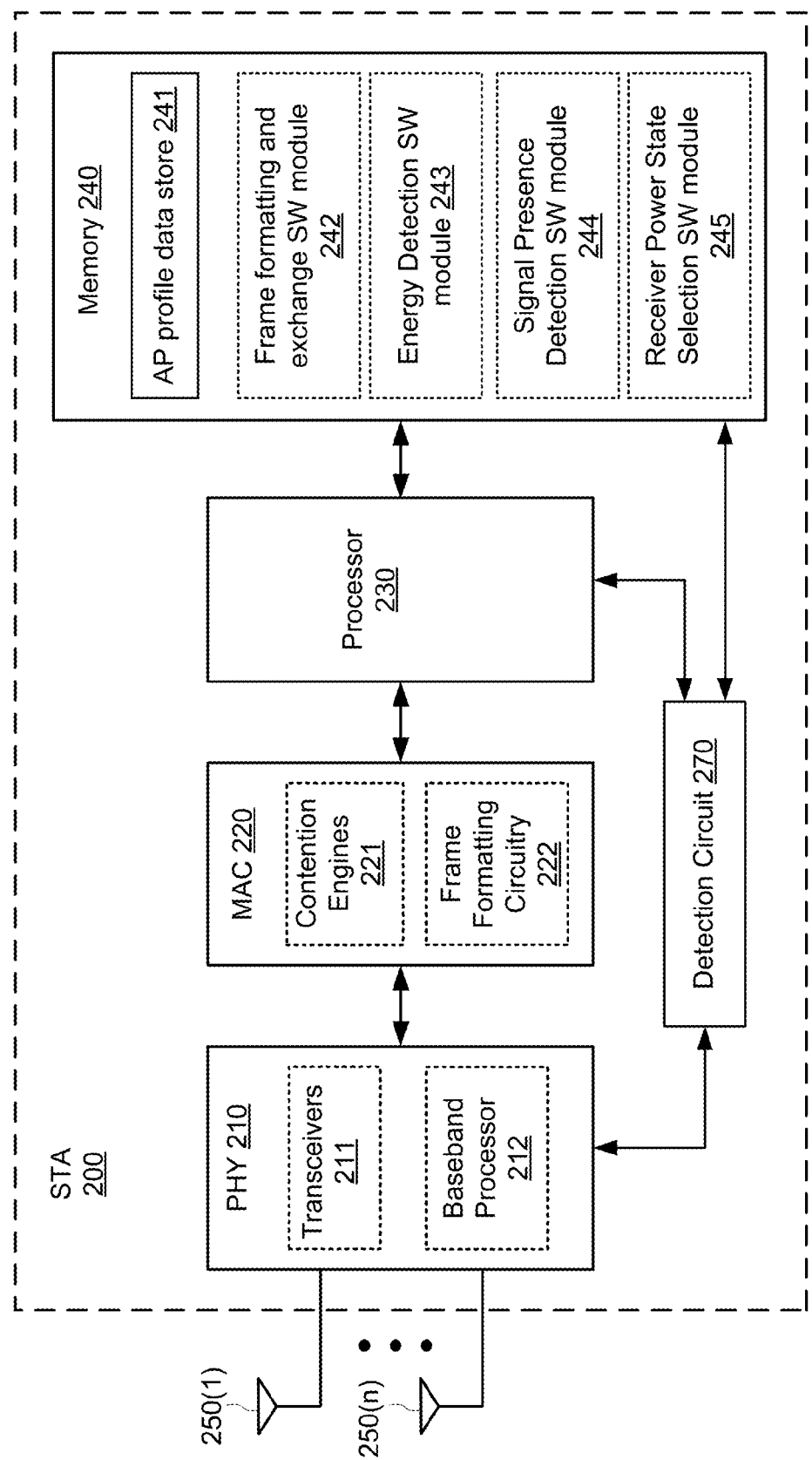
FIG. 2 shows a block diagram of a wireless station (STA) in accordance with example embodiments.

FIG. 2 shows an example STA 200 that may be one embodiment of any of the stations STA1-STA4 of FIG. 1. The STA 200 may include a PHY device 210 including at least a number of transceivers 211 and a baseband processor 212, may include a MAC 220 including at least a number of contention engines 221 and frame formatting circuitry 222, may include a processor 230, may include a memory 240, and may include a number of antennas 250(1)-250(n). The transceivers 211 may be coupled to antennas 250(1)-250(n), either directly or through an antenna selection circuit (not shown for simplicity). The transceivers 211 may be used to transmit signals to and receive signals from AP 110 and/or other STAs (see also FIG. 1), and may be used to scan the surrounding environment to detect and identify nearby access points and/or other STAs (e.g., within wireless range of STA 200). Although not shown in FIG. 2 for simplicity, the transceivers 211 may include any number of transmit chains to process and transmit signals to other wireless devices via antennas 250(1)-250(n), and may include any number of receive chains to process signals received from antennas 250(1)-250(n). Thus, for example embodiments, the STA 200 may be configured for multiple-input, multiple-output (MIMO) operations. The MIMO operations may include single-user MIMO (SU-MIMO) operations and multi-user MIMO (MU-MIMO) operations.

The baseband processor 212 may be used to process signals received from processor 230 and/or memory 240 and to forward the processed signals to transceivers 211 for transmission via one or more of antennas 250(1)-250(n), and may be used to process signals received from one or more of antennas 250(1)-250(n) via transceivers 211 and to forward the processed signals to processor 230 and/or memory 240.

For purposes of discussion herein, MAC 220 is shown in FIG. 2 as being coupled between PHY device 210 and processor 230. For actual embodiments, PHY device 210, MAC 220, processor 230, and/or memory 240 may be connected together using one or more buses (not shown for simplicity).

The contention engines 221 may contend for access to one or more shared wireless mediums, and may also store packets for transmission over the one more shared wireless mediums. The STA 200 may include one or more contention engines 221 for each of a plurality of different access categories. For other embodiments, the contention engines 221 may be separate from MAC 220. For still other embodiments, the contention engines 221 may be implemented as one or more software modules (e.g., stored in memory 240 or stored in memory provided within MAC 220) containing instructions that, when executed by processor 230, perform the functions of contention engines 221.

The frame formatting circuitry 222 may be used to create and/or format frames received from processor 230 and/or memory 240 (e.g., by adding MAC headers to PDUs provided by processor 230), and may be used to re-format frames received from PHY device 210 (e.g., by stripping MAC headers from frames received from PHY device 210).

The STA 200 may also include a detection circuit 270. The detection circuit 270, which may be coupled to PHY device 210, processor 230, and/or memory 240, may be used to detect a narrow band wireless signal of interest in the presence of wide-band interference, as described in more detail below.

Memory 240 may include an AP profile data store 241 that stores profile information for a plurality of APs. The profile information for a particular AP may include information including, for example, the AP's service set identification (SSID), MAC address, channel information, received signal strength indicator (RSSI) values, goodput values, channel state information (CSI), supported data rates, connection history with the AP, a trustworthiness value of the AP (e.g., indicating a level of confidence about the AP's location, etc.), and any other suitable information pertaining to or describing the operation of the AP.

Figure 9:
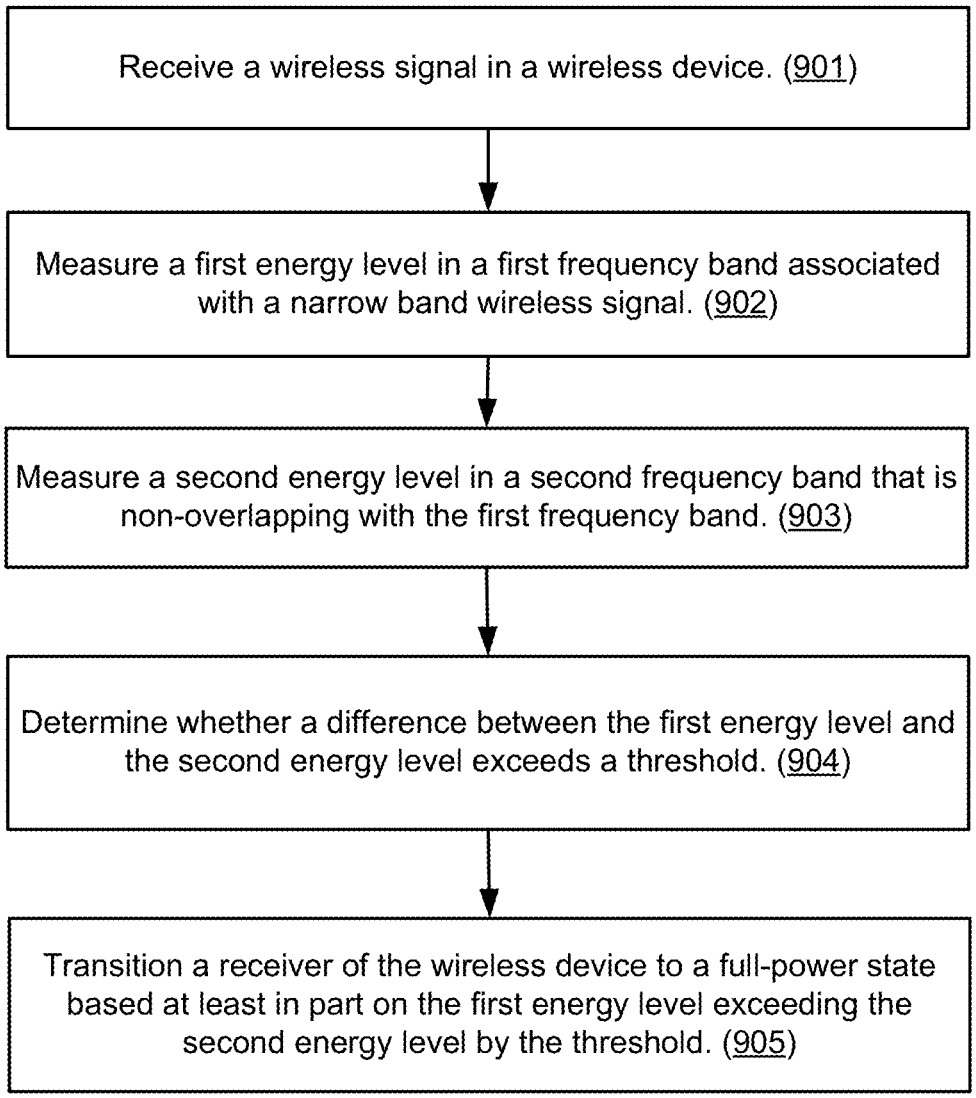
FIG. 9 shows an illustrative flow chart depicting example operations for detecting a likely presence of a narrow band wireless signal, in accordance with example embodiments.

Memory 240 may also include a non-transitory computer-readable medium (e.g., one or more nonvolatile memory elements, such as EPROM, EEPROM, Flash memory, a hard drive, and so on) that may store at least the following software (SW) modules:

a frame formatting and exchange software module 242 to facilitate the creation and exchange of any suitable frames (e.g., data frames, action frames, control frames, and management frames) between STA 200 and other wireless devices (e.g., as described for one or more operations of FIG. 9);

an energy detection software module 243 to facilitate the detection of energy levels of received signals in one or more selected frequency bands (e.g., as described for one or more operations of FIG. 9);

a signal presence detection software module 244 to facilitate a determination of whether a narrow band wireless signal is likely to be present in a received wireless signal based at least in part on detected signal energy levels in the one or more selected frequency bands (e.g., as described for one or more operations of FIG. 9); and a receiver power state selection software module 245 to facilitate the selection of an appropriate receiver power state based on the likelihood of the presence of a narrow band wireless signal in a received wireless signal (e.g., as described for one or more operations of FIG. 9).

Each software module includes instructions that, when executed by processor 230, cause STA 200 to perform the corresponding functions. The non-transitory computer-readable medium of memory 240 thus includes instructions for performing all or a portion of the STA-side operations depicted in FIG. 9.

Processor 230, which is shown in the example of FIG. 2 as coupled to PHY device 210, to MAC 220, and to memory 240, may be any suitable one or more processors capable of executing scripts or instructions of one or more software programs stored in STA 200 (e.g., within memory 240). For example, processor 230 may execute the frame formatting and exchange software module 242 to facilitate the creation and exchange of any suitable frames (e.g., data frames, action frames, control frames, and management frames) between STA 200 and other wireless devices. Processor 230 may also execute the energy detection software module 243 to facilitate the detection of energy levels of received signals in one or more selected frequency bands. Processor 230 may also execute the signal presence detection software module 244 to facilitate a determination of whether a narrow band wireless signal is likely to be present in a received wireless signal based at least in part on detected signal energy levels in the one or more selected frequency bands. Processor 230 may also execute the receiver power state selection software module 245 to facilitate the selection of an appropriate receiver power state based on the likelihood of the presence of a narrow band wireless signal in a received wireless signal.

Figure 3:
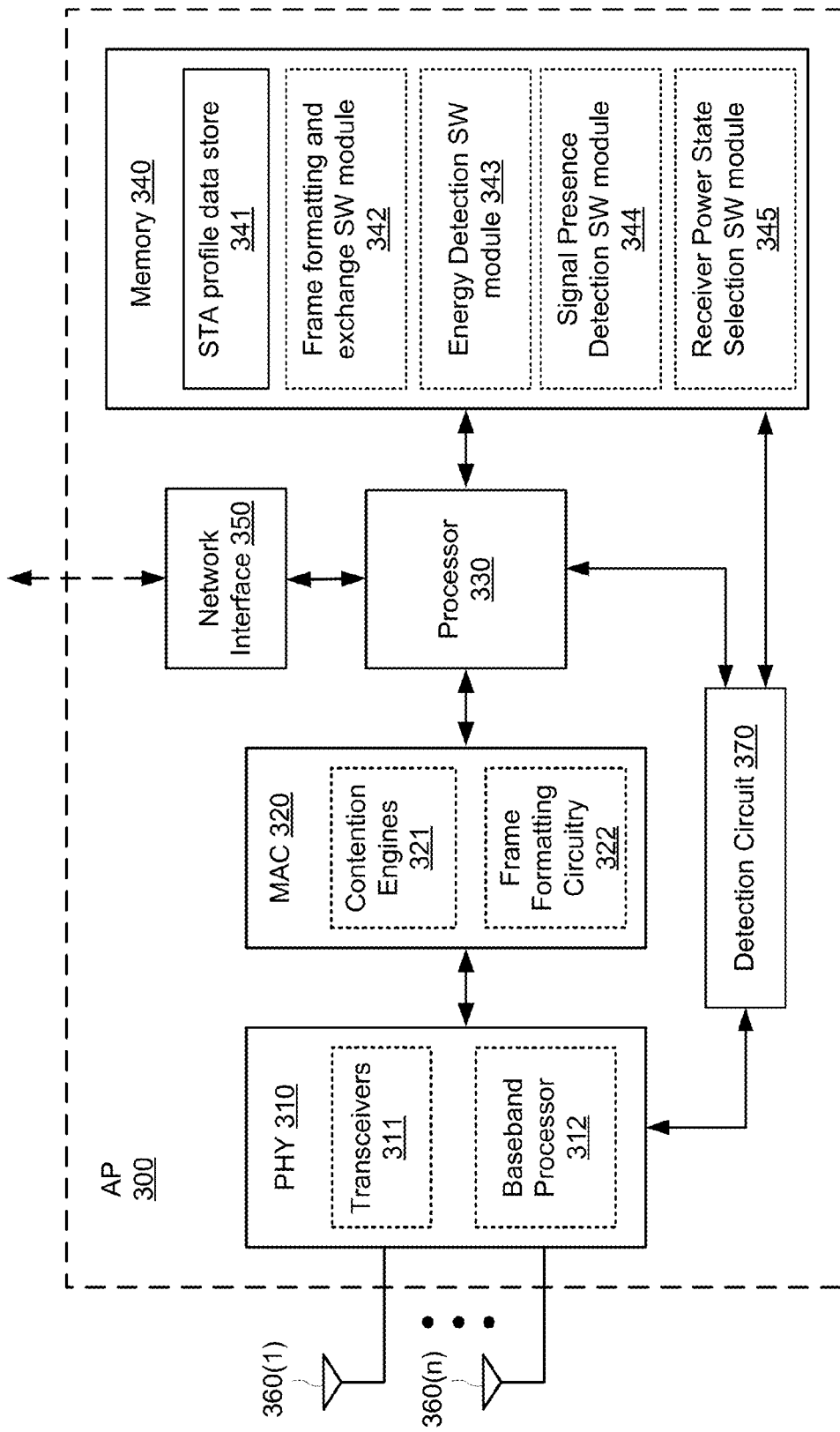
FIG. 3 shows a block diagram of an access point (AP) in accordance with example embodiments.

FIG. 3 shows an example AP 300 that may be one embodiment of the AP 110 of FIG. 1. AP 300 may include a PHY device 310 including at least a number of transceivers 311 and a baseband processor 312, may include a MAC 320 including at least a number of contention engines 321 and frame formatting circuitry 322, may include a processor 330, may include a memory 340, may include a network interface 350, and may include a number of antennas 360(1)-360(n). The transceivers 311 may be coupled to antennas 360(1)-360(n), either directly or through an antenna selection circuit (not shown for simplicity). The transceivers 311 may be used to communicate wirelessly with one or more STAs, with one or more other APs, and/or with other suitable devices. Although not shown in FIG. 3 for simplicity, the transceivers 311 may include any number of transmit chains to process and transmit signals to other wireless devices via antennas 360(1)-360(n), and may include any number of receive chains to process signals received from antennas 360(1)-360(n). Thus, for example embodiments, the AP 300 may be configured for MIMO operations including, for example, SU-MIMO operations and MU-MIMO operations.

The baseband processor 312 may be used to process signals received from processor 330 and/or memory 340 and to forward the processed signals to transceivers 311 for transmission via one or more of antennas 360(1)-360(n), and may be used to process signals received from one or more of antennas 360(1)-360(n) via transceivers 311 and to forward the processed signals to processor 330 and/or memory 340.

The network interface 350 may be used to communicate with a WLAN server (not shown for simplicity) either directly or via one or more intervening networks and to transmit signals.

Processor 330, which is coupled to PHY device 310, to MAC 320, to memory 340, and to network interface 350, may be any suitable one or more processors capable of executing scripts or instructions of one or more software programs stored in AP 300 (e.g., within memory 340). For purposes of discussion herein, MAC 320 is shown in FIG. 3 as being coupled between PHY device 310 and processor 330. For actual embodiments, PHY device 310, MAC 320, processor 330, memory 340, and/or network interface 350 may be connected together using one or more buses (not shown for simplicity).

The contention engines 321 may contend for access to the shared wireless medium, and may also store packets for transmission over the shared wireless medium. For some embodiments, AP 300 may include one or more contention engines 321 for each of a plurality of different access categories. For other embodiments, the contention engines 321 may be separate from MAC 320. For still other embodiments, the contention engines 321 may be implemented as one or more software modules (e.g., stored in memory 340 or within memory provided within MAC 320) containing instructions that, when executed by processor 330, perform the functions of contention engines 321.

The frame formatting circuitry 322 may be used to create and/or format frames received from processor 330 and/or memory 340 (e.g., by adding MAC headers to PDUs provided by processor 330), and may be used to re-format frames received from PHY device 310 (e.g., by stripping MAC headers from frames received from PHY device 310).

The AP 300 may also include a detection circuit 370. The detection circuit 370, which may be coupled to PHY device 310, processor 330, and/or memory 340, may be used to detect a narrow band wireless signal of interest in the presence of wide-band interference, as described in more detail below.

Memory 340 may include a STA profile data store 341 that stores profile information for a plurality of STAs. The profile information for a particular STA may include information including, for example, its MAC address, supported data rates, connection history with AP 300, and any other suitable information pertaining to or describing the operation of the STA.

Memory 340 may also include a non-transitory computer-readable medium (e.g., one or more nonvolatile memory elements, such as EPROM, EEPROM, Flash memory, a hard drive, and so on) that may store at least the following software (SW) modules:

a frame formatting and exchange software module 342 to facilitate the creation and exchange of any suitable frames (e.g., data frames, action frames, control frames, and management frames) between AP 300 and other wireless devices (e.g., as described for one or more operations of FIG. 9);

an energy detection software module 343 to facilitate the detection of energy levels of received signals in one or more selected frequency bands (e.g., as described for one or more operations of FIG. 9);

a signal presence detection software module 344 to facilitate a determination of whether a narrow band wireless signal is likely to be present in a received wireless signal based at least in part on detected signal energy levels in the one or more selected frequency bands (e.g., as described for one or more operations of FIG. 9); and a receiver power state selection software module 345 to facilitate the selection of an appropriate receiver power state based on the likelihood of the presence of a narrow band wireless signal in a received wireless signal (e.g., as described for one or more operations of FIG. 9).

Each software module includes instructions that, when executed by processor 330, cause AP 300 to perform the corresponding functions. The non-transitory computer-readable medium of memory 340 thus includes instructions for performing all or a portion of the AP-side operations depicted in FIG. 9

Processor 330, which is shown in the example of FIG. 3 as coupled to PHY device 310 via MAC 320, to memory 340, and to network interface 350, may be any suitable one or more processors capable of executing scripts or instructions of one or more software programs stored in AP 300 (e.g., within memory 340). For example, processor 330 may execute the frame formatting and exchange software module 342 to facilitate the creation and exchange of any suitable frames (e.g., data frames, action frames, and management frames) between AP 300 and other wireless devices. Processor 330 may also execute the energy detection software module 343 to facilitate the detection of energy levels of received signals in the one or more selected frequency bands. Processor 330 may execute the signal presence detection software module 344, to facilitate a determination of whether a narrow band signal is likely to be present in a received wireless signal, based at least in part on detected signal energy levels in specified energy band. Processor 330 may also execute the receiver power state selection software module 345 to facilitate the selection of an appropriate receiver power state based on a detected likelihood of the presence of a narrow band wireless signal in a received wireless signal.

Figure 4A:
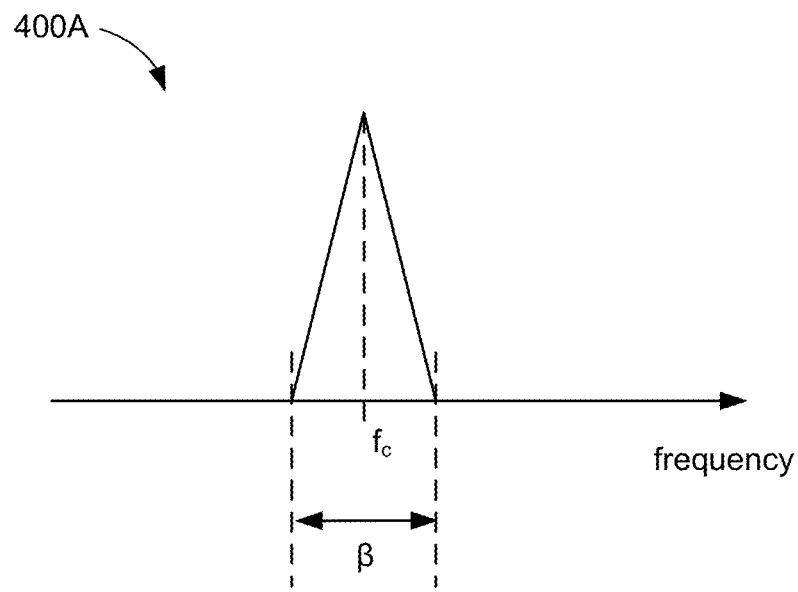
FIG. 4A shows a frequency spectrum of an example narrow band wireless signal.
Figure 4B:
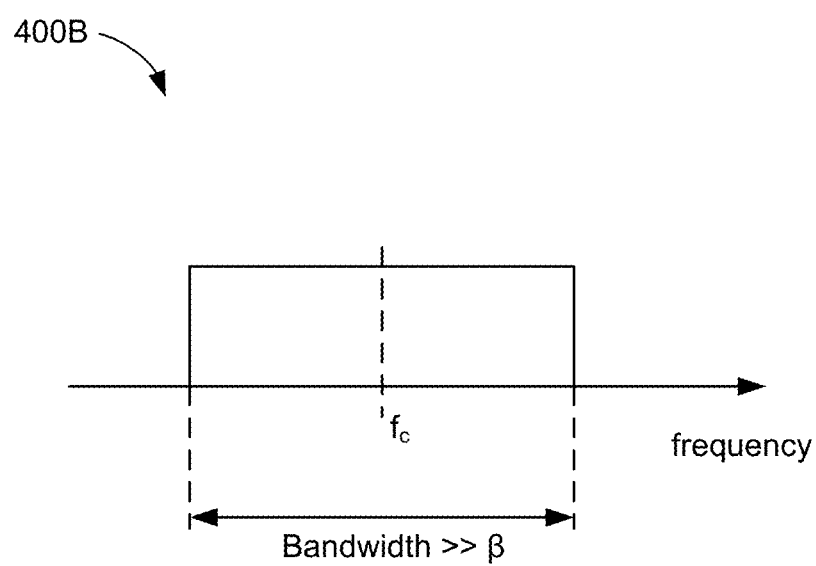
FIG. 4B shows a frequency spectrum of an example wide-band noise or interference signal.

As described above, example embodiments may allow a wireless device to detect a likely presence of a narrow band wireless signal, in the presence of wide-band interference, without transitioning the wireless device's receiver to a full-power state (e.g., while the receiver is in a low-power state). For example, FIG. 4A shows a frequency spectrum 400A of an example narrow band wireless signal having a bandwidth 13 and a center frequency $f_c$. FIG. 4B shows a frequency spectrum 400B of an example wide-band interference signal having a bandwidth much larger than the bandwidth 13 of the example narrow band wireless signal of FIG. 4A. Note that the example frequency spectra of FIGS. 4A and 4B are presented in a general form, and in practice the frequency spectra of narrow band wireless signals and wide-band noise or interference signals may vary, for example, based on the wireless communication protocols used and/or the source of the interference signal. Additionally, note that while the wide-band interference signal of FIG. 4B is shown as having a frequency spectrum centered at $f_c$, in practice the wide-band signal may have a frequency spectrum centered at other frequencies—as long as the noise spectrum substantially overlaps the narrow band wireless signal's frequency spectrum, the wide-band signal may interfere with the narrow band wireless signal of interest.

Figure 5:
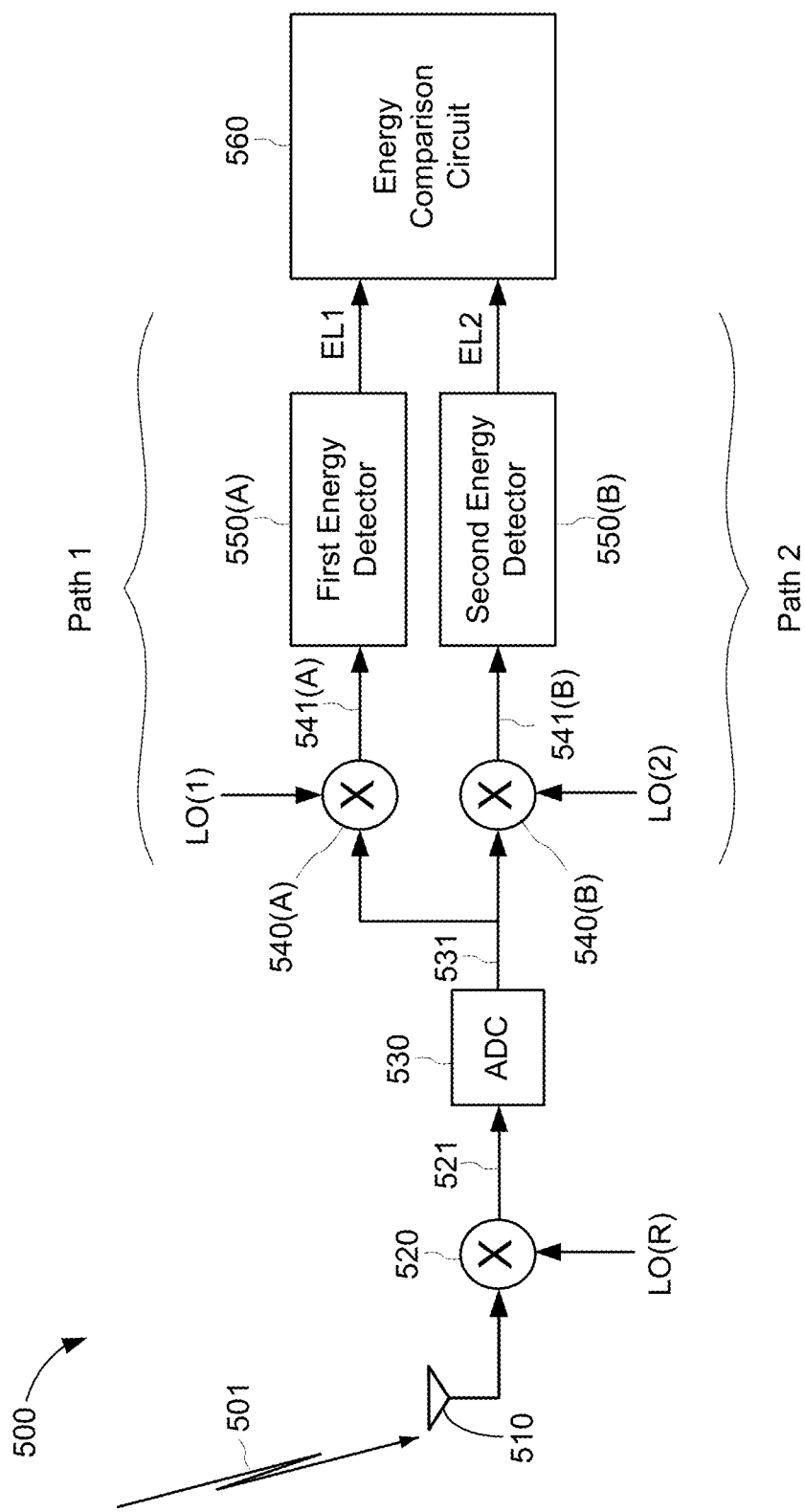
FIG. 5 shows a block diagram of a device for detecting a likely presence of a narrow band wireless signal, in accordance with example embodiments.

FIG. 5 shows a block diagram of a device 500 for detecting a likely presence of a narrow band wireless signal, in accordance with example embodiments. The device 500 may be implemented within a wireless station such as STA 200 of FIG. 2, within an access point such as AP 300 of FIG. 3, and/or within any suitable wireless device. For one example, the device 500 may be one embodiment of the detection circuit 270 of the STA 200 of FIG. 2 (or the functions of device 500 may be performed by processor 230 executing instructions stored in memory 240). For another example, the device 500 may be one embodiment of the detection circuit 370 of the AP 300 of FIG. 3 (or the functions of device 500 may be performed by processor 330 executing instructions stored in memory 340).

The device 500 may include one or more antennas 510 (only one antenna shown for simplicity), a receive mixer 520, an analog-to-digital converter (ADC) 530, a first energy detection path (path 1), a second energy detection path (path 2), and an energy comparison circuit 560. Path 1 includes a first mixer 540(A) and a first energy detector 550(A). Path 2 includes a second mixer 540(B) and a second energy detector 550(B). As described in more detail below, path 1 may be used to measure a first energy level in a first frequency band associated with the narrow band wireless signal of interest, path 2 may be used to measure a second energy level in a second frequency band that is non-overlapping with the first frequency band, and the energy comparison circuit 560 may be used to determine whether a difference between the first energy level and the second energy level exceeds a threshold. Thereafter, a wireless receiver provided within a wireless device (not shown in FIG. 5 for simplicity) may be selectively transitioned to a full-power state (e.g., from a low power state) based on the difference exceeding the threshold. In some aspects, the wireless receiver may enter (or be caused to enter) the full-power state based on the difference exceeding the threshold, and the wireless receiver may remain (or be caused to remain) in the low power state based on the difference not exceeding the threshold.

For example, referring also to FIG. 2, a number of receive chains provided within transceivers 211 of the STA 200 may be in a low power state when wireless signals are received. Thereafter, if the difference between the first energy level and the second energy level exceeds the threshold (e.g., indicating a likelihood that a narrow band wireless signal of interest is present within the received wireless signals), then one or more of the receive chains may be transitioned to a full-power state, for example, to decode data embedded within the narrow band wireless signal of interest. Conversely, if the difference between the first energy level and the second energy level does not exceed the threshold (e.g., indicating that the narrow band wireless signal of interest is not likely to be present within the received wireless signals), then the receive chains may remain in the low power state, for example, to conserve power.

Referring again to FIG. 5, a wireless signal 501 may be received by the one or more antennas 510. A narrow band wireless signal (e.g., the signal of interest to be detected) and/or a wide-band interference signal may be contained within or received with the wireless signal 501. The receive mixer 520 may use a receive local oscillator signal LO(R) to down-convert the received wireless signal 501 from a carrier frequency to an intermediate frequency ($f_{IF}$). The carrier frequency, which may refer to the frequency of a carrier signal used to transmit the narrow band wireless signal, may have an associated center frequency $f_c$. The intermediate frequency $f_{IF}$ may be any suitable intermediate frequency. Thus, in some aspects, the LO(R) signal may have a frequency $f_{LO(R)}=f_c-f_{IF}$. The resulting intermediate frequency signal 521 may then be sampled (and digitized) by the ADC 530. The sampled signal 531 may then be provided to both the first path (path 1) and to the second path (path 2).

The first path (path 1) may measure an energy level of the sampled signal 531 within an expected frequency band of the narrow band wireless signal. More specifically, the first mixer 540(A) may use a first local oscillator signal LO(1) to down-convert the sampled signal 531 from the intermediate frequency $f_{IF}$ to a baseband frequency. In this manner, the resulting down-converted signal 541(A) may contain narrow band wireless signal components at the baseband frequency (e.g., if the narrow band wireless signal is present). The energy level of the narrow band wireless signal components at the baseband frequency may then be measured using the first energy detector 550(A). In some examples, the first energy detector 550(A) may measure the energy within a detector frequency band interval (−Bd, Bd). For at least some embodiments, the LO(1) signal may have a frequency $f_{LO(1)}=f_{IF}$, for example, so that the down-converted signal 541(A) occupies a first frequency range centered at 0. In some aspects, the first frequency range may have a bandwidth denoted as β. In this manner, the first energy detector 550(1) may measure the energy level of the narrow band wireless signal at DC. For other embodiments, the LO(1) signal may be of other suitable frequencies, for example, to down-covert the sampled signal 531 to other suitable baseband frequencies.

The second path (path 2) may measure an energy level of the sampled signal 531 within a frequency band that is outside of the expected frequency band of the narrow band wireless signal. More specifically, the second mixer 540(B) may use a second local oscillator signal LO(2) to down-convert the sampled signal 531 from the intermediate frequency $f_{IF}$ to another frequency that falls outside the expected frequency band of the narrow band wireless signal. The energy level of the wide-band interference may then be measured using the second energy detector 550(B). In some examples, the second energy detector 550(B) may measure the energy level of the wide-band interference signal within the same detector band interval used by the first energy detector 550(A). For at least some embodiments, the LO(2) signal may have a frequency $f_{LO(1)}=-2*f_{IF}$, for example, so that the down-converted signal 541(B) occupies a second frequency range centered at an imaginary intermediate frequency $-f_{IF}$. In some aspects, the second frequency range may have a bandwidth denoted as β, and is offset from the first frequency range by a value (α) corresponding to the intermediate frequency. In this manner, the second energy detector 550(2) may measure the energy level of the wide-band interference signal in a frequency band (e.g., the second frequency band) that does not overlap the expected frequency band of the narrow band wireless signal (e.g., the first frequency band). For other embodiments, the LO(2) signal may be of other suitable frequencies, for example, to down-covert the sampled signal 531 to another other suitable frequency.

The first energy level (EL1) measured by the first energy detector 550(A) and the second energy level (EL2) measured by the second energy detector 550(B) may be provided to the energy comparison circuit 560. Energy comparison circuit 560 may compare the two measured energy levels EL1 and EL2 and, based on the comparison, may determine whether a detectable narrow band wireless signal is likely to be present in the received wireless signal 501.

More specifically, energy comparison circuit 560 may determine whether a difference between the first energy level EL1 and the second energy level EL2 exceeds a threshold. If the difference exceeds the threshold, then the narrow band wireless signal is likely to be present in the received wireless signal 501, and an associated receiver (e.g., one or more receive chains in STA 200 or AP 300) may be transitioned to a full-power state, for example, such that all components therein are powered on. For some embodiments, the receiver may be powered off or may remain in a low-power state until the presence of the narrow band wireless signal is detected (e.g., based on the comparison performed by the energy comparison circuit 560).

Conversely, if the difference does not exceed the threshold (e.g., because the narrow band wireless signal is not present or because the energy level of the narrow band wireless signal does not exceed the energy level of the wide-band interference by an amount sufficient to allow the narrow band wireless signal to be detected), then the receiver may remain in the low-power state, for example, to conserve power.

The threshold may depend on a communication protocol of the expected narrow band wireless signal. For example, if the narrow band wireless signal is a Bluetooth Low Energy signal, then detection of the narrow band wireless signal may depend on the first energy level EL1 being at least between approximately 8-10 dB higher than the second energy level EL2. Further, because some communication protocols may allow for detection of narrow band wireless signals even when the energy of the narrow band wireless signal is less than the energy of wide-band interference, the threshold may for some embodiments have a negative value. For example, narrow band wireless signals transmitted according to the IEEE 802.15.4 communication protocol may be detected even when the energy of the wide-band interference exceeds the energy of the narrow band wireless signal by 2 dB.

For at least some embodiments, the energy comparison circuit 560 may also determine whether the first energy level EL1 exceeds a minimum expected energy level of the narrow band wireless signal. For example, if the narrow band wireless signal is present in the received wireless signal 501, then the first energy level EL1 should exceed the minimum expected energy level. Thus, if the first energy level EL1 does not exceed the minimum expected energy level, then the receiver may not be fully powered on (e.g., the receiver may remain in the low-power state), even if the difference between the first energy level EL1 and the second energy level EL2 exceeds the threshold.

Figure 6:
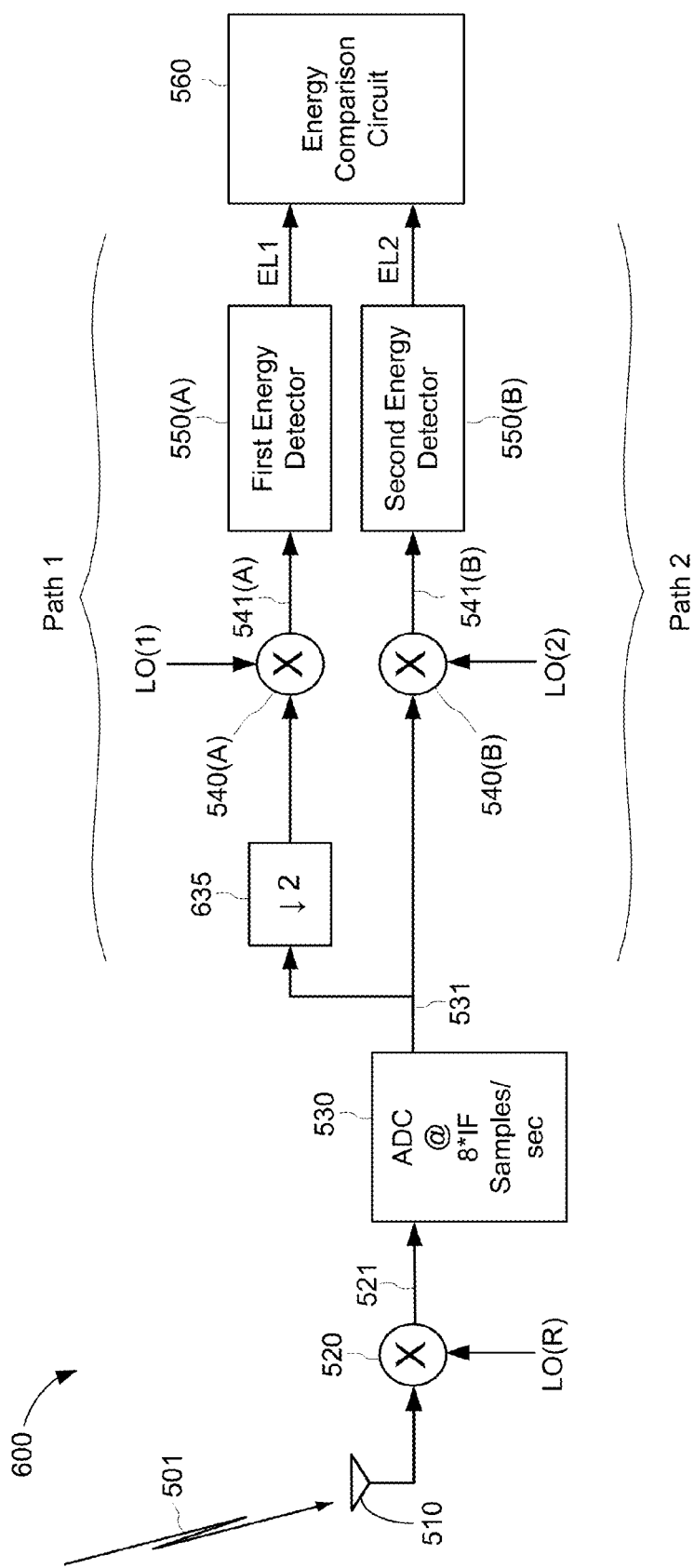
FIG. 6 shows a block diagram of another device for detecting a likely presence of a narrow band wireless signal, in accordance with example embodiments.

FIG. 6 shows a block diagram of a device 600 for detecting a likely presence of a narrow band wireless signal, in accordance with example embodiments. Device 600 may be one example implementation of device 500. More specifically, device 600 may be an energy efficient implementation of device 500. Device 600 includes all the elements of device 500 of FIG. 5, with the addition of a down-sampler 635 provided in path 1 between the ADC 530 and the first mixer 540(A). Further, for the device 600 of FIG. 6, the ADC 530 may be configured to sample the down-converted signal provided by the receive mixer 520 at sampling rate equal to $8*f_{IF}$ samples per second.

The down-sampler 635 may be configured to down-sample the sampled signal 531 by a factor of 2. In this manner, the signal provided to first mixer 540(A) is effectively sampled at rate equal to $4*f_{IF}$ samples per second prior to being down-converted to the baseband frequency by the first mixer 540(A). The signal 531 output by the ADC 530 is down-converted by second mixer 540(B) to another frequency. It is to be understood that the example sampling rates discussed above with respect to FIG. 6 are merely illustrative, and that other suitable sampling rates may be used.

Figure 7:
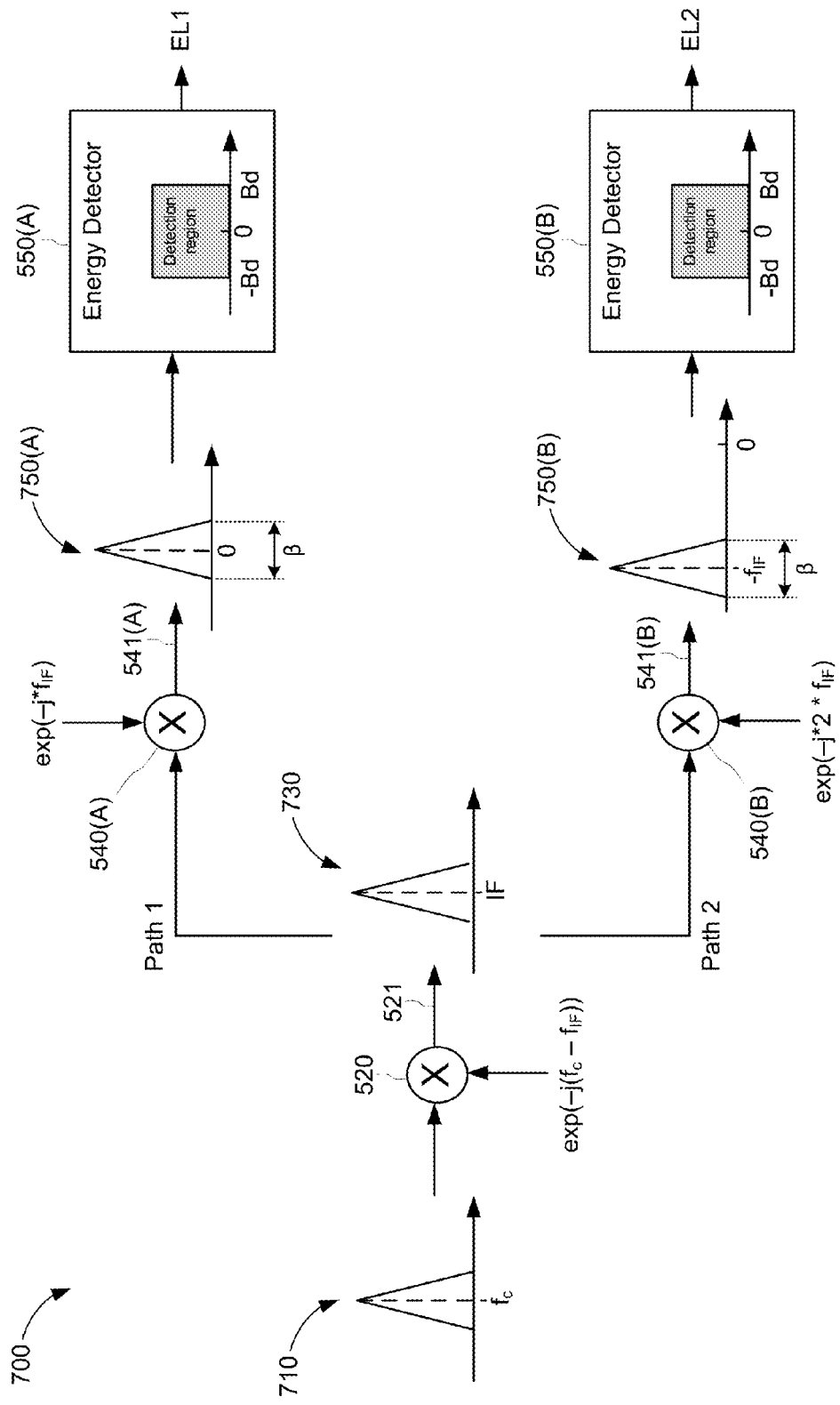
FIG. 7 shows a diagram depicting frequency spectra associated with detecting a presence of a narrow band wireless signal, in accordance with some embodiments.

FIG. 7 shows a diagram 700 depicting an example detection of a narrow band wireless signal in the presence of wide-band interference, in accordance with some embodiments. As depicted in FIG. 7, a wireless signal containing a narrow band wireless signal having a frequency spectrum 710 centered at $f_c$ may be received, for example, by antenna 510 of device 500 of FIG. 5 and/or device 600 of FIG. 6. After the mixer 520 down-converts the received signal to the intermediate frequency $f_{IF}$, the resulting down-converted signal 521 may have a frequency spectrum 730. The down-converted signal 521 may then be provided to the first path (path 1) and the second path (path 2). The signal 521 may be down-converted to baseband by the first mixer 540(A). The resulting down-converted signal 541(A), which is depicted to have a frequency spectrum 750(A), may be provided to the first energy detector 550(A). The first energy detector 550(A) may detect the energy within a frequency interval $(-Bd, Bd)$, where $|Bd|=\beta/2$. More specifically, because path 1 down-converts the received wireless signal to baseband, the energy level ED measured by the first energy detector 550(A) may reflect the energy of the narrow band wireless signal.

The second mixer 540(B) down-converts the signal 521 to generate signal 541(B) depicted in FIG. 7 as having a frequency spectrum 750(B) centered at a frequency of $-f_{IF}$. Because $|f_{IF}|>>Bd$, the second energy detector 550(B) may not detect energy associated with the narrow band wireless signal, and thus the measured energy level EL2 may not reflect the energy of the narrow band wireless signal. Accordingly, because the first energy level EL1 may exceed the second energy level EL2 by at least the threshold, an associated receiver may be fully powered on (e.g., transitioned from a low-power state to a full-power state) to receive and decode the narrow band wireless signal of interest.

Figure 8:
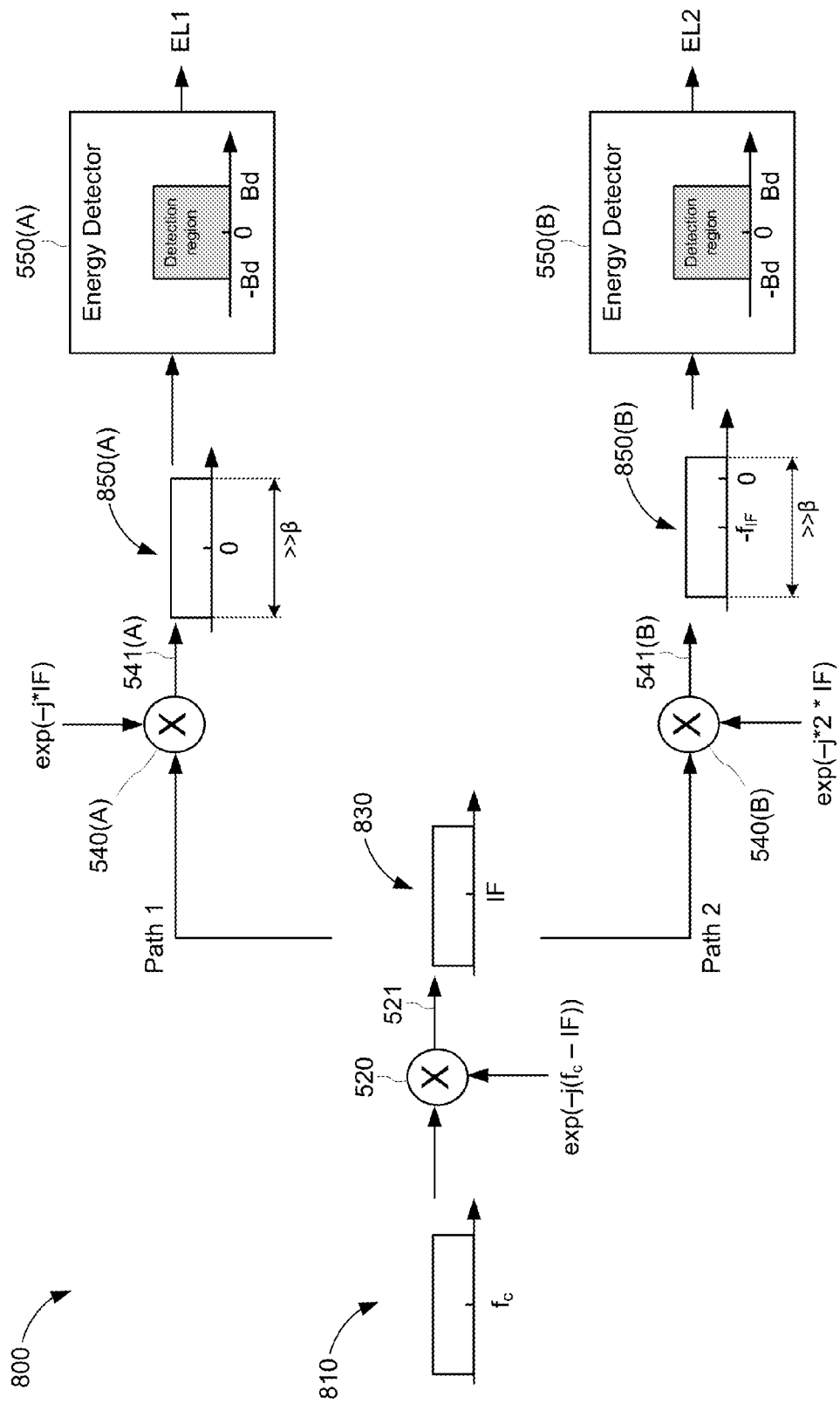
FIG. 8 shows a diagram depicting frequency spectra associated with not detecting a presence of a narrow band wireless signal presence, in accordance with some embodiments.

FIG. 8 shows a diagram 800 depicting frequency spectra associated with an example non-detection of a narrow band wireless signal in the presence of wide-band interference, in accordance with some embodiments. In contrast to the example of FIG. 7, the narrow band wireless signal of interest is not present in the example diagram 800 shown in FIG. 8. As depicted in FIG. 8, a wireless signal containing only wide-band interference is received. The received wireless signal has a frequency spectrum 810 centered at $f_c$. After the mixer 520 down-converts the received signal to the intermediate frequency $f_{IF}$, the resulting down-converted signal 521 may have a frequency spectrum 830. In path 1, the signal 521 may be down-converted to baseband by the first mixer 540(A). The resulting down-converted signal 541(A), which is depicted to have a frequency spectrum 850(A), may be provided to the first energy detector 550(A). The first energy detector 550(A) may measure the energy level EL1 of the down-converted signal 541(A) within the frequency interval $(-Bd, Bd)$. In path 2, the signal 521 may be down-converted to $-f_{IF}$ by the second mixer 540(B). The resulting down-converted signal 541(B), which is depicted to have a frequency spectrum 850(B), may be provided to the second energy detector 550(A). The second energy detector 550(A) may detect the energy within the frequency interval denoted (−Bd, Bd).

As depicted in FIG. 8, the wide-band interference signal has a bandwidth much greater than the bandwidth of the narrow band wireless signal (e.g., $\gg\beta$). As a result, both the first energy detector 550(A) and the second energy detector 550(B) may detect energy levels associated with the wide-band interference signal, and thus the difference between the first energy level ED measured by the first energy detector 550(A) and the second energy level EL2 measured by the second energy detector 550(B) may be less than the threshold. More specifically, if the difference between the first energy level ED and the second energy level EL2 is less than the threshold (which may indicate that a narrow band wireless signal of interest is not present in the received wireless signal), then the associated receiver may not be fully powered on (e.g., the associated receiver may remain in a low-power state) to conserve power. For at least some embodiments, the associated receiver may not be fully powered on if the first energy level EL1 is less than the minimum expected energy level for the narrow band wireless signal, even if the difference between the first energy level EL1 and the second energy level EL2 exceeds the threshold. In this manner, power consumption may be conserved when detection of the narrow band wireless signal, although present in the received wireless signal, may not be feasible (e.g., due to the strength of wide-band interference).

FIG. 9 is an illustrative flow chart depicting an example operation 900 for detecting a narrow band wireless signal in the presence of wide-band interference, in accordance with some embodiments. The example operation 900 may be performed by any suitable wireless device, such as any of AP 110 or STA1-STA4 of FIG. 1, STA 200 of FIG. 2, or AP 300 of FIG. 3. Referring also to FIGS. 2-8, a wireless device may receive a wireless signal (901). For example, the wireless signal may be received by one or more of antennas 250(1)-250(n) of STA 200 and/or by one or more of antennas 360(1)-360(n) of AP 300. The wireless signal may contain a narrow band wireless signal of interest and/or wide-band interference.

The device may measure a first energy level of the wireless signal in a first frequency band associated with the narrow band wireless signal (902). The first frequency band may be the expected frequency band of the narrow band wireless signal. In some embodiments, the first energy level may be measured by executing energy detection software module 243 of STA 200, by executing energy detection software module 343 of AP 300, and/or by using the first energy detector 550(A) of FIG. 5. Next, the device may measure a second energy level of the wireless signal in a second frequency band that is non-overlapping with the first frequency band (903). In some aspects, the second frequency band may be offset from the first frequency band. The second energy level may be measured by executing energy detection software module 243 of STA 200, by executing energy detection software module 343 of AP 300, and/or by using the second energy detector 550(B) of FIG. 5.

The device may determine whether a difference between the first energy level and the second energy level exceeds a threshold (904). This determination may be made by executing signal presence detection software module 244 of STA 200, by executing signal presence software module 344 of AP 300, and/or by using the energy comparison circuit 560 of FIG. 5. The threshold may correspond to a maximum acceptable interference level for a communication protocol of the narrow band wireless signal. For some implementations, the threshold may have a negative value, for example, to indicate that the maximum acceptable interference level for the communication protocol of the narrow band wireless signal exceeds the energy level of the narrow band wireless signal. In some embodiments, the device may also determine whether the first energy level exceeds a minimum expected energy level of the narrow band wireless signal.

The device may then transition an associated wireless receiver to a full-power state (e.g., from a low-power state) based at least in part on the first energy level exceeding the second energy level by the threshold (905). As mentioned above, if the first energy level exceeds the second energy level by the threshold, then the narrow band wireless signal is likely to be present in the received wireless signal. In response thereto, the wireless receiver may be fully powered on, for example, so that the wireless receiver may receive and decode the narrow band wireless signal of interest. The receiver may be powered up by executing receiver power state selection software module 245 of STA 200 or by executing receiver power state selection software module 345 of AP 300. Conversely, if the first energy level does not exceed the second energy level by the threshold, then the narrow band wireless signal is not likely to be present in the received wireless signal. In response thereto, the wireless receiver may not be fully powered on, for example, to conserve power.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. Accordingly, one aspect of the disclosure may include a non-transitory computer readable medium embodying a method for detecting the presence of narrow band signals in wide-band interference. The term "non-transitory" does not exclude any physical storage medium or memory and particularly does not exclude dynamic memory (e.g., conventional random access memory (RAM)) but rather excludes only the interpretation that the medium can be construed as a transitory propagating signal.

In the foregoing specification, the example embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for detecting a narrow band wireless signal in a presence of wide-band interference, the method performed by a wireless device and comprising:
   receiving a wireless signal;
   measuring a first energy level of the wireless signal in a first frequency band associated with the narrow band wireless signal;
   measuring a second energy level of the wireless signal in a second frequency band that is non-overlapping with the first frequency band;
   determining whether a difference between the first energy level and the second energy level exceeds a threshold; and
   transitioning a receiver of the wireless device to a full-power state based, at least in part, on the difference between the first energy level and the second energy level exceeding the threshold.

2. The method of claim 1, wherein the receiver is in a low-power state when the wireless signal is received.

3. The method of claim 1, further comprising:
   determining whether the first energy level exceeds a minimum expected energy level for the narrow band wireless signal; and
   preventing the receiver from transitioning to the full-power state based, at least in part, on the first energy level not exceeding the minimum expected energy level.

4. The method of claim 1, wherein the threshold corresponds to a maximum acceptable interference level for a communication protocol of the narrow band wireless signal.

5. The method of claim 4, wherein the threshold has a negative value, the negative value indicating that the maximum acceptable interference level for the protocol of the narrow band wireless signal exceeds the first energy level.

6. The method of claim 1, wherein the narrow band wireless signal is a Bluetooth signal.

7. The method of claim 1, wherein measuring the first energy level comprises:
   down-converting the wireless signal from a carrier frequency to an intermediate frequency;
   sampling the down-converted wireless signal;
   down-converting the sampled signal to generate a first signal at a baseband frequency; and
   measuring the energy of the first signal within a detector frequency band centered at the baseband frequency.

8. The method of claim 7, wherein measuring the second energy level comprises:
   down-converting the sampled signal to generate a second signal at another frequency that is offset from the baseband frequency by a value corresponding to the intermediate frequency; and
   measuring the energy of the second signal within the detector frequency band.

9. A wireless device, comprising:
   one or more processors;
   one or more transceivers; and
   a memory storing one or more programs comprising instructions that, when executed by the one or more processors, cause the wireless device to detect a narrow band wireless signal in a presence of wide-band interference by performing operations comprising:
   receiving a wireless signal;
   measuring a first energy level of the wireless signal in a first frequency band associated with the narrow band wireless signal;
   measuring a second energy level of the wireless signal in a second frequency band that is non-overlapping with the first frequency band;
   determining whether a difference between the first energy level and the second energy level exceeds a threshold; and
   transitioning a receiver of the wireless device to a full-power state based, at least in part, on the difference between the first energy level and the second energy level exceeding the threshold.

10. The wireless device of claim 9, wherein the receiver is in a low-power state when the wireless signal is received.

11. The wireless device of claim 9, wherein execution of the instructions cause the wireless device to perform operations further comprising:
    determining whether the first energy level exceeds a minimum expected energy level for the narrow band wireless signal; and
    preventing the receiver from transitioning to the full-power state based, at least in part, on the first energy level not exceeding the minimum expected energy level.

12. The wireless device of claim 9, wherein the threshold corresponds to a maximum acceptable interference level for a communication protocol of the narrow band wireless signal.

13. The wireless device of claim 12, wherein the threshold has a negative value, the negative value indicating that the maximum acceptable interference level for the protocol of the narrow band wireless signal exceeds the first energy level.

14. The wireless device of claim 9, wherein the narrow band wireless signal is a Bluetooth signal.

15. The wireless device of claim 9, wherein execution of the instructions to measure the first energy level causes the wireless device to perform operations comprising:
    down-converting the wireless signal from a carrier frequency to an intermediate frequency;
    sampling the down-converted wireless signal;
    down-converting the sampled signal to generate a first signal at a baseband frequency; and
    measuring the energy of the first signal within a detector frequency band centered at the baseband frequency.

16. The wireless device of claim 15, wherein execution of the instructions to measure the second energy level causes the wireless device to perform operations comprising:
    down-converting the sampled signal to generate a second signal at another frequency that is offset from the baseband frequency by a value corresponding to the intermediate frequency; and
    measuring the energy of the second signal within the detector frequency band.

17. A non-transitory computer-readable storage medium storing one or more programs containing instructions that, when executed by one or more processors of a wireless device, cause the wireless device to detect a narrow band wireless signal in a presence of wide-band interference by performing operations comprising:
receiving a wireless signal;
measuring a first energy level of the wireless signal in a first frequency band associated with the narrow band wireless signal;
measuring a second energy level of the wireless signal in a second frequency band that is non-overlapping with the first frequency band;
determining whether a difference between the first energy level and the second energy level exceeds a threshold; and
transitioning a receiver of the wireless device to a full-power state based, at least in part, on the difference between the first energy level and the second energy level exceeding the threshold.

18. The non-transitory computer-readable storage medium of claim 17, wherein the receiver is in a low-power state when the wireless signal is received.

19. The non-transitory computer-readable storage medium of claim 17, wherein execution of the instructions cause the wireless device to perform operations further comprising:
determining whether the first energy level exceeds a minimum expected energy level for the narrow band wireless signal; and
preventing the receiver from transitioning to the full-power state based, at least in part, on the first energy level not exceeding the minimum expected energy level.

20. The non-transitory computer-readable storage medium of claim 17, wherein the threshold corresponds to a maximum acceptable interference level for a communication protocol of the narrow band wireless signal.

21. The non-transitory computer-readable storage medium of claim 20, wherein the threshold has a negative value, the negative value indicating that the maximum acceptable interference level for the protocol of the narrow band wireless signal exceeds the first energy level.

22. The non-transitory computer-readable storage medium of claim 17, wherein the narrow band wireless signal is a Bluetooth signal.

23. The non-transitory computer-readable storage medium of claim 17, wherein execution of the instructions to measure the first energy level causes the wireless device to perform operations comprising:
down-converting the wireless signal from a carrier frequency to an intermediate frequency;
sampling the down-converted wireless signal;
down-converting the sampled signal to generate a first signal at a baseband frequency; and
measuring the energy of the first signal within a detector frequency band centered at the baseband frequency.

24. The non-transitory computer-readable storage medium of claim 23, wherein execution of the instructions to measure the second energy level causes the wireless device to perform operations comprising:
down-converting the sampled signal to generate a second signal at another frequency that is offset from the baseband frequency by a value corresponding to the intermediate frequency; and
measuring the energy of the second signal within the detector frequency band.

25. A wireless device for detecting a narrow band wireless signal in a presence of wide-band interference, the wireless device comprising:
means for receiving a wireless signal;
means for measuring a first energy level of the wireless signal in a first frequency band associated with the narrow band wireless signal;
means for measuring a second energy level of the wireless signal in a second frequency band that is non-overlapping with the first frequency band;
means for determining whether a difference between the first energy level and the second energy level exceeds a threshold; and
means for transitioning a receiver of the wireless device to a full-power state based, at least in part, on the difference between the first energy level and the second energy level exceeding the threshold.

26. The wireless device of claim 25, wherein the receiver is in a low-power state when the wireless signal is received.

27. The wireless device of claim 25, further comprising:
means for determining whether the first energy level exceeds a minimum expected energy level for the narrow band wireless signal; and
means for preventing the receiver from transitioning to the full-power state based, at least in part, on the first energy level not exceeding the minimum expected energy level.

28. The wireless device of claim 25, wherein the threshold corresponds to a maximum acceptable interference level for a communication protocol of the narrow band wireless signal.

29. The wireless device of claim 28, wherein the threshold has a negative value, the negative value indicating that the maximum acceptable interference level for the protocol of the narrow band wireless signal exceeds the first energy level.

30. The wireless device of claim 25, wherein the narrow band wireless signal is a Bluetooth signal.

* * * * *